US010052730B2

(12) United States Patent
Cheng et al.

(10) Patent No.: US 10,052,730 B2
(45) Date of Patent: Aug. 21, 2018

(54) DC-MOTOR

(71) Applicants: Peng Cheng, Sundsvall (SE); Bengt Oelmann, Sundsvall (SE); Stefan Haller, Sundsvsall (SE)

(72) Inventors: Peng Cheng, Sundsvall (SE); Bengt Oelmann, Sundsvall (SE); Stefan Haller, Sundsvsall (SE)

( * ) Notice: Subject to any disclaimer, the term of this patent is extended or adjusted under 35 U.S.C. 154(b) by 0 days.

(21) Appl. No.: 15/563,328

(22) PCT Filed: Mar. 31, 2016

(86) PCT No.: PCT/EP2016/057098
§ 371 (c)(1),
(2) Date: Sep. 29, 2017

(87) PCT Pub. No.: WO2016/156511
PCT Pub. Date: Oct. 6, 2016

(65) Prior Publication Data
US 2018/0065221 A1    Mar. 8, 2018

(30) Foreign Application Priority Data

Mar. 31, 2015   (EP) .................................... 15161984

(51) Int. Cl.
*H02K 23/04*         (2006.01)
*B23Q 5/16*          (2006.01)
(Continued)

(52) U.S. Cl.
CPC ............... *B23Q 5/16* (2013.01); *H02K 21/28* (2013.01); *H02K 29/06* (2013.01); *H02K 29/14* (2013.01); *H02P 7/28* (2013.01); *H02K 29/03* (2013.01)

(58) Field of Classification Search
CPC ...... H02P 1/00; H02P 1/04; H02P 3/00; H02P 5/00; H02P 6/00; H02P 7/00; H02P 21/00;
(Continued)

(56) References Cited

U.S. PATENT DOCUMENTS 5,059,876 A * 10/1991 Shah .................... H01F 38/18
                                                    318/400.09
5,124,606 A *  6/1992 Eisenbeis ............ H02K 17/30
                                                    112/277
(Continued)

*Primary Examiner* — Antony M Paul
(74) *Attorney, Agent, or Firm* — Condo Roccia Koptiw LLP

(57) ABSTRACT

A variable-speed direct current motor comprising a stator (22), a rotor (23) arranged within the stator, and a motor drive device (40) arranged partly at the stator and partly at the rotor, wherein the stator comprises a yoke (25) defining a cylindrical cavity (31), and a plurality of permanent magnets (24) arranged at the yoke, wherein the rotor comprises a cylindrical core (26) and a conductor structure (47) arranged at the core, wherein the motor drive device comprises an alternating current transformer (41) having a primary winding (42) arranged at the stator and a secondary winding (43) arranged at the rotor, a rectifier device (44) arranged at the rotor and connected with the secondary winding, a direct current supply device (45) arranged at the rotor (23) and connected with the rectifier device (44), and with the conductor structure (47), and an operation control device (48) comprising a first unit (49) arranged at the rotor (23) and a second unit (50) arranged externally of the rotor and wirelessly communicating with the first unit.

19 Claims, 10 Drawing Sheets

(51) Int. Cl.
*H02K 29/06* (2006.01)
*H02K 29/14* (2006.01)
*H02P 7/28* (2016.01)
*H02K 21/28* (2006.01)
*H02K 29/03* (2006.01)

(58) Field of Classification Search
CPC .......... H02P 7/28; H02K 29/06; H02K 29/03;
H02K 29/14; H02K 21/28; H02K 37/12;
H02K 17/00; H02K 19/12; H02K 37/00;
H02K 37/10; H02K 23/00; H02K 23/04;
H02K 21/26; B23Q 5/16
USPC ..... 318/400.01, 400.09, 700, 701, 727, 430,
318/432; 310/49.28, 49.32, 49.46, 49.53,
310/152, 154.01, 154.21, 154.32, 156.01,
310/12.13, 12.15, 12.21, 12.24, 12.28,
310/129, 130, 137, 156.81, 165, 166, 171;
340/4.42
See application file for complete search history.

(56) References Cited

U.S. PATENT DOCUMENTS

| | | |
|---|---|---|
| 5,424,625 A | 6/1995 | Haner |
| 5,491,398 A | 2/1996 | Haner |
| 5,686,805 A | 11/1997 | Haner |
| 5,770,936 A | 6/1998 | Hirai et al. |
| 5,936,374 A | 8/1999 | Haner |
| 6,049,187 A | 4/2000 | Haner |
| 6,321,032 B1 | 11/2001 | Jones et al. |
| 7,166,984 B1 | 1/2007 | Jones et al. |
| 7,375,488 B2 | 5/2008 | Jones |
| 7,737,598 B2 * | 6/2010 | Ionel .................. H02K 1/148 310/216.058 |

\* cited by examiner

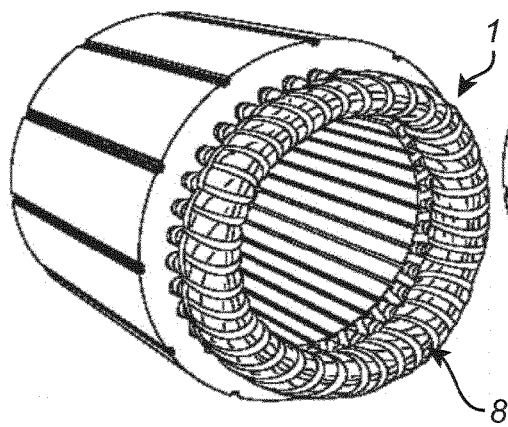
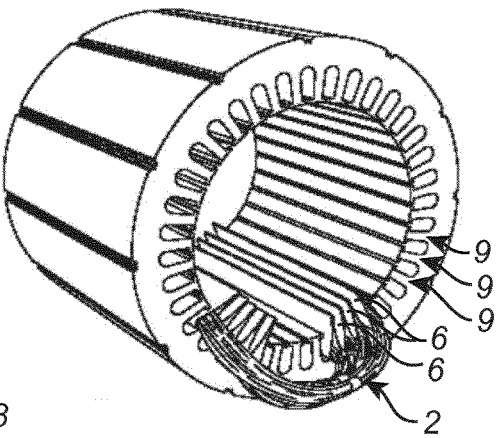
Fig. 1A
Fig. 1B
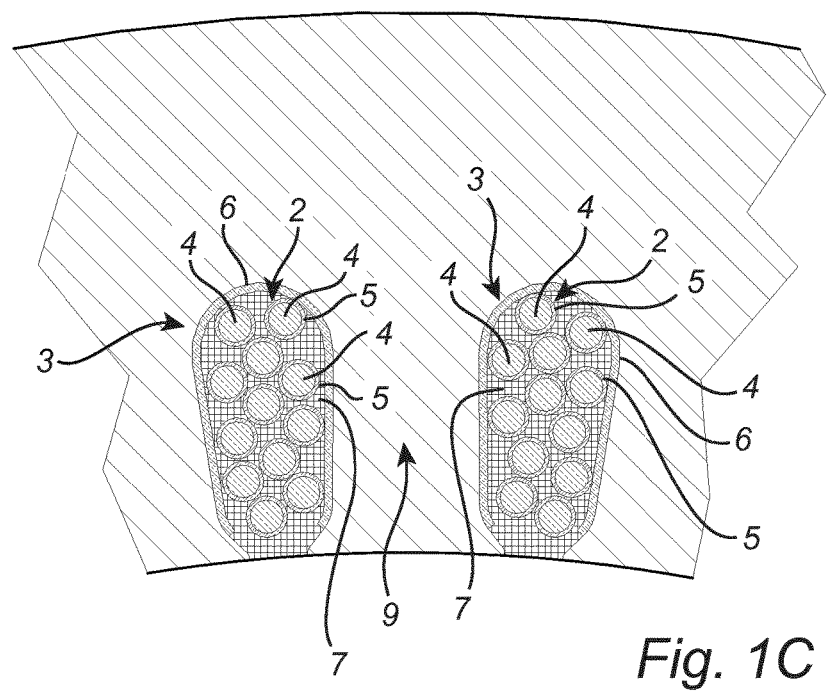
Fig. 1C

DC-MOTOR

CROSS REFERENCE TO RELATED APPLICATIONS

This application is the National Stage Entry under 35 U.S.C. § 371 of Patent Cooperation Treaty Application No. PCT/EP2016/057098, filed 31 Mar. 2016, which claims the benefit of European Application No. 15161984.8, filed 31 Mar. 2015, the contents of which are hereby incorporated by reference herein.

FIELD OF THE INVENTION

The present invention relates to a variable-speed direct current (DC) motor.

TECHNICAL BACKGROUND

The presently most popular motors used in various industries are squirrel-cage induction motors (SQIMs) and brushless permanent-magnet motors (BLPMMs), where SQIM accounts for more than 90% of all industrial motors in use. The modern SQIM and BLPMM have similar stator designs where distributed copper windings around electrical steel laminates are used to create a rotating magnetic field. However, their rotor designs are different. SQIM has a cylindrical rotor shaft with die-casted aluminum or copper squirrel-cage structure on electrical steel laminates. In contrast, BLPMM has permanent magnets either mounted near the surface, forming a cylindrical rotor or buried inside the electrical steel laminates for a salient-pole rotor. While BLPMM typically achieves better efficiency and power density, SQIM has dominated the industry for more than half a century due to its high reliability, decent efficiency and low production cost.

It is estimated that almost one third of the worldwide generated electrical energy is consumed by industrial motors. The electricity bill can account for up to 95% of the lifetime cost of owning and running these motors. Hence the efficiency of a motor is an obvious key parameter for the industry to optimize. When a variable-speed motor with a high operating efficiency is needed in industrial applications, usually an electrical system called variable-frequency drive (VFD) is used to power and control the connected motor. The basic architecture of a modern VFD's power electronics system includes three distinct stages. First the rectifier stage which is built with either passive power diodes, or active insulated gate bipolar transistors (IGBTs) for regenerative and power-factor-correction functions, and optional input filters. Second a DC link stage which is built with a high-voltage capacitor bank, line filtering chokes, a brake chopper and an optional brake resistor. Finally an inverter stage which is built with IGBTs and optional output filters.

Over time, much effort has been taken to improve both the wiring techniques and electrical steel properties in order to improve the overall efficiency of the motor. A lot of efforts have also been taken to improve the performance and reduce the losses of the IGBTs, the high-voltage capacitors and the filters in the VFD in order to further increase the efficiency of the drive. However, the potential for efficiency improvement diminishes since these technologies have been matured. As the requirements on efficiency and performance increase for variable-speed motor applications, it is necessary to start looking beyond the existing.

In order to enhance the understanding of the problems involved in the current motor constructions, below design details of SQIM and BLPMM will be explained. For state of the art SQIM and BLPMM, most of their motor losses are originated at the stator in the forms of stator winding conductor resistive loss and stator electrical steel iron loss. The designs that affect these two major loss sources are described in the following sections.

As for the stator winding resistive loss, because these motors are designed to operate at AC utility voltages with high stator winding inductance, they typically use a multi-turn distributed randomly wound stator winding 1 that is made with round enameled copper wires 2 as the most popular design approach, such as the example stator winding shown in FIGS. 1A to 1D. FIG. 1C shows a schematic cross-sectional view of such a winding 1 in the electrical steel slot openings 3. Except for its high complexity and the associated cost to manufacture and assemble, this multi-turn distributed randomly wound winding 1 is characterized with several disadvantages. Firstly, the electrical steel slot filling factor, which is the ratio of the total cross-sectional area of the copper 4 of the winding to that of the slot opening 3, is low, typically only between 0.4 and 0.65. This is both because space-consuming electrical insulations 5 and 6 are needed both among individual wires and between wires and the slot wall of electrical steel, and because randomly wound round wires leave a lot of space in between them that is then filled with varnish 7. As these insulation materials and varnish typically have low thermal conductivity, the low slot filling factor leads to a higher current density, worse heat dissipation and higher operating temperature to the copper wires which then all translate to a higher winding resistive loss. Secondly, the end-winding portions 8 of the distributed stator winding that extend out of the electrical steel slots at both ends of the stator, as for example shown in FIG. 1D, are large. These end-wiring portions 8 contribute to the total copper use and to the total stator length and resistive loss but not to the motor's effective torque and power. This is because the winding distribution around the stator requires a lot of insulated wires to go across the slots and cross each other many times in order to connect the whole winding. This, in turn, leads to the end-winding portions taking a lot of space and also contributing a lot to the total stator winding resistive loss.

As for the electrical steel iron loss of SQIM and BLPMM, most of the loss is concentrated on the stator rather than on the rotor. The rotor side core iron loss is low because the rotor electrical steel volume is a lot smaller than that of the stator in an typical in-runner motor design, and because during the motor operation, the magnetic flux on the rotor is either slowly rotating at a slip frequency of only few Hertz, in the case of SQIM, or remains largely static, in the case of BLPMM. The stator side iron loss on the other hand is much higher, firstly because of its much bigger core size and higher magnetic flux rotation frequency, secondly because of the low slot filling factor described above. The slot opening size needs to be larger in the design of SQIM and BLPMM in order to reduce the current density and limit the operating temperature of the stator winding, but this approach inevitably results into a reduction of path width 9 between slots for passing of the magnetic flux in the stator electrical steel, which then leads to a reduction of mutual magnetic coupling between the stator and the rotor of the motor and a higher magnetic flux density in between the slots of the stator electrical steel. These effects then translate into both a high stator electrical steel iron loss and a lower stator winding inductance and a low power factor for the motor. Also because of the motor's low winding inductance and low power factor, they translate into a high magnetization current and hence a high RMS current in the stator winding, which then also adds to the total stator winding resistive loss of the motor.

Because of the design issues described above for SQIM and BLPMM, it is obvious that the present brushless motors with their inherent drawbacks are no longer capable of fulfilling an ever increasing efficiency requirement on industrial variable-speed motor applications. Hence a new variable-speed motor design is needed to further improve the efficiency by solving the problems of SQIM and BLPMM motors and to further reduce the stator losses.

U.S. Pat. No. 5,059,876 discloses the use of a rotary transformer in a brushless motor to provide citation to rotor armature. The output of the secondary transformer winding on the rotor is rectified and fed to the rotor armature. The rotary transformer is a convenient way to provide a brushless structure with a DC fed rotor armature, which is an alternative solution to SQIM and BLPMM. However, the motor still suffers from high losses of the stator having field coils. FIG. 25 of U.S. Pat. No. 5,770,936 discloses a similar concept of utilizing rotary transformer and on-rotor rectification to power a motor at a rotor shaft tip on a machine tool. However, no information is given regarding the design of such a motor except for merely calling it as a DC motor, and variable speed operation of the motor at high efficiency is not mentioned at all.

U.S. Pat. Nos. 5,424,625, 5,491,398, 5,686,805, 5,936,374, 6,049,187, 6,321,032, 7,166,984, and 7,375,488 each discloses a brushless repulsion motor, which is an AC motor having a stator winding excitation and a rotor armature which can be selectively shorted by on-rotor electronics means to produce torque, and the sensing and control electronics and its method to achieve torque and speed control of the motor.

SUMMARY OF THE INVENTION

It would be advantageous to provide a variable-speed direct current motor which has an improved efficiency compared with state of the art motors.

To better address this concern, in a first aspect of the present invention there is presented a variable-speed DC motor comprising a stator, a rotor arranged within the stator, and a motor drive device arranged partly at the stator and partly at the rotor. The stator comprises a yoke defining a cylindrical cavity, and a plurality of permanent magnets arranged at the yoke. The rotor comprises a cylindrical core and a conductor structure arranged at the core. The motor drive device comprises an alternating current transformer, having a primary winding arranged at the stator and a secondary winding arranged at the rotor, a rectifier device arranged at the rotor and connected with the secondary winding, a direct current supply device arranged at the rotor and connected with the rectifier device, and with the conductor structure, and an operation control device comprising a first unit arranged at the rotor and a second unit arranged externally of the rotor and wirelessly communicating with the first unit.

This brushless variable-speed DC motor design provides, inter alia, the following advantages. Due to a DC structure, and the on-rotor drive system of the DC motor, the efficiency compared to the above-mentioned prior art motors with AC drives is increased. More specifically, the overall efficiency improvement of the variable-speed motor in the invention comes from the combination of the following advantageous points. Compared with conventional motors, the total electrical steel iron loss of the present motor is much lower; firstly because most of the electrical steel used in the motor is located on the stator and is largely lossless as it mainly facilitates a static magnetic field generated by the stator-mount permanent magnets; and secondly because the smaller volume rotor-mount electrical steel can benefit from a higher slot filling factor of the rotor-excited winding and this results into lower average magnetic flux density and lower iron loss. Due to its true DC drive design, this motor can operate at a power factor approaching one and it avoids AC resistive losses from the skin effect and proximity effect associated with conventional AC motors, which further minimize the resistive and magnetic losses and also reduce the need of capacitors in the drive. It is to be noted, that above-mentioned U.S. Pat. No. 5,059,876 gives no description regarding how the motor layout, its two armatures and its electrical circuits are designed or configured for achieving the functionality of variable speed operation at high efficiency. One factor to obtain the efficient powering of the on-rotor drive system is the AC transformer, which is a rotary transformer. A rotary transformer is a specialized transformer used to transfer AC electrical energy in a contactless or brushless manner between two parts that rotate in relation to each other. Same to conventional transformers, the energy transfer is based on the physics of electromagnetic induction.

In accordance with an embodiment of the DC motor, the conductor structure comprises a squirrel cage structure, a lap winding structure, or a wave winding structure, which are all advantageous structures.

In accordance with an embodiment of the DC motor, the squirrel cage structure is made of die-casted aluminum or copper, wherein the core comprises slots through which the squirrel cage structure extends, which slots are pre-coated with an electrical insulation coating. This is an advantageous structure because it can be manufactured with aluminum or copper in a die casting method into a solid rotor piece which achieves a very low cost production, and be conformed with the shape of the slot, with an electrical steel slot filling factor approaching one and superior mechanical robustness. Since a squirrel cage structure is essentially a single-turn winding, it is more preferred to be used in motors with larger rotor sizes or higher nominal operating speeds in order to achieve high enough back-electromotive force suitable to the operating voltage of the motor drive device. For example, a DC motor with such a squirrel cage structure on-rotor conductor and a two-pole permanent magnet stator, having an average stator-rotor air gap flux density of about 1 Tesla, and its rotor having an outer diameter of 250 mm and an active axial length of 380 mm, operating at a speed of 3000 rpm, will generate a back-electromotive force of about 30 V between the terminals of the squirrel cage structure across the two magnetic poles. It is then suitable to excite this squirrel cage structure with a 40 V rated motor drive device.

In accordance with an embodiment of the DC motor, the conductor structure comprises a lap winding, also called parallel winding, or a wave winding, also called series winding, structure. These are advantageous structures for motors with smaller rotor sizes or with lower operating speeds to achieve both a high electrical steel slot filling factor and a high enough back-electromotive force suitable to the operating voltage of the motor drive device. For example, a DC motor with such an on-rotor simplex lap winding structure and a two-pole permanent magnet stator, having an arc angle of 160 degree for each magnetic pole and an average stator-rotor air gap flux density of about 1 Tesla, and its rotor having 26 circumferentially separated slots near its outer surface with two insulated wires in each slot, and the rotor having an outer diameter of 92 mm and an active axial length of 70 mm, operating at a speed of 3000 rpm, will generate a back-electromotive force of about 22 V between the terminals of the simplex lap winding structure across the two magnetic poles. It is then suitable to excite this lap winding structure with a 30 V rated motor drive device. In accordance with this embodiment, for DC motors with four or more magnetic poles, a wave winding produces proportionally more back-electromotive force than the corresponding lap winding at the same rotor speed, and this back-electromotive force ratio between a wave winding and its corresponding lap winding is the number of magnetic pole pairs of the DC motor. So for example, for a four-pole motor this ratio is two and for a six-pole motor this ratio is three. In accordance with this fact and in order to design an efficient DC motor for a certain operating speed according to the present invention, a skilled person can choose a suitable pole number for the motor and select the corresponding winding design between a lap winding and a wave winding in order to optimally match the electromotive force of the winding to the operating voltage of the motor drive device.

In accordance with an embodiment of the DC motor, the lap winding and the wave winding structures are made of pre-formed enameled copper wires, which are interconnected by means of ultrasonic welds.

In accordance with an embodiment of the DC motor, the core of the rotor is provided with circumferentially separated slots extending along the length of the core near its surface, each slot containing a respective one of the conductors of the squirrel cage, lap winding, or wave winding structure of conductors, each conductor comprising at least one turn of wire. This embodiment further supports the lowering of losses. It should be noted that for the purposes of this application, the term slot includes both open structures, such as grooves, and closed structures, such as pipes.

In accordance with an embodiment of the DC motor, the alternating current transformer comprises at least one magnetic core around its primary winding and at least one magnetic core around its secondary winding. Thereby, the magnetic coupling between the two windings is facilitated. The at least one magnetic core can be further divided into a stator part that is located around the primary winding and a rotor part that is located around the secondary winding.

In accordance with an embodiment of the DC motor, the direct current supply device comprises a direct current transformer arranged to down-transform a direct current voltage received from the rectifier device to another direct current voltage adapted to an excitation of the conductor structure to operate the direct current motor. This embodiment provides for further improvements of the efficiency of the motor. Furthermore, the direct current transformer can comprise multiple synchronous buck converters with a bi-directional, parallel and multi-phase topology, whereby a low loss DC/DC conversion is obtained. Enabling the DC motor to be driven at low voltages and high currents provides further possibilities of improving the efficiency of the DC motor.

In accordance with an embodiment of the direct current motor, the direct current supply device comprises a electronic commutator, which is connected between the direct current transformer and the conductor structure, which electronic commutator comprises semiconductor switches to commutate the respective conductors of the conductor structure based on a relative position between the respective conductors and the plurality of permanent magnets and on a rotational speed of the rotor. Thus, the commutator is a high current low voltage commutator based on semiconductor switches. These semiconductor switches can be paralleled together to further reduce the resistive power loss of the electronic commutator.

In accordance with an embodiment of the direct current motor, the rectifier device is a high current low voltage active rectifier based on semiconductor switches, which supports power factor correction function and bi-directional power flow.

In accordance with an embodiment of the DC motor, the rectifier device, the direct current supply device, and the first unit of the operation control device comprise at least one circular board mounted at a centre shaft of the rotor. Thereby, the basis for a compact and well-balanced structure is provided.

In accordance with an embodiment of the DC motor, the rectifier device, the direct current supply device and the first unit of the operation control device are arranged on at least one circular board mounted at a centre shaft of the rotor.

In accordance with an embodiment of the DC motor, the electronic commutator comprised in the direct current supply device comprises at least one circular board mounted at a centre shaft of the rotor.

In accordance with an embodiment of the DC motor, the rectifier device is an active rectifier which comprises active semiconductor switches with a parallel topology. An advantage of this embodiment is that the voltage drop across the switches and hence the power loss in the rectifier is reduced. Another advantage of this embodiment is that the active rectifier can be controlled to support both power-factor correction and also the bi-directional power flow that enables regenerative braking function to this DC motor.

In accordance with an embodiment of the DC motor, the direct current supply device comprises multiple synchronous buck converters with a bi-directional, parallel and multi-phase topology. An advantage of this embodiment is that the drive voltage and drive current can have less harmonics ripple contents and higher precision, so the variable speed control can be more precise, and the drive needs less filtering capacitors which reduces size and cost. Additionally, individual phases can be turned off during a situation of lower motor load in order to further increase the efficiency. The bi-directional topology also enables regenerative braking function to this DC motor.

In accordance with an embodiment of the DC motor, an on-rotor drive system comprising the rectifier device and the direct current supply device, has an architecture which supports bi-directional power flow. Thereby, it can provide a regenerative braking function.

In accordance with an embodiment of the DC motor, an on-rotor drive system comprising the rectifier device, the direct current supply device in which the electronic commutator is comprised, has an architecture which supports bi-directional power flow. Thereby, it can provide a regenerative braking function.

In accordance with an embodiment of the DC motor, the primary winding is configured to be connected with a three-phase power source, and the rectifier device is a full wave rectifier.

In accordance with an embodiment of the DC motor, the permanent magnets are elongated, extend between the ends of the stator cavity, and are grouped in at least two groups, each constituting a pole, and wherein the permanent magnets within each group are arranged adjacent to each other.

In accordance with an embodiment of the DC motor, each group contain magnets of different grades, where at least one magnet at the middle of the group has the highest grade.

Thereby, the air gap magnetic flux density becomes more homogeneous across the groups.

In accordance with an embodiment of the DC motor, the permanent magnets are chosen from a group comprising of Neodymium—Iron—Boron (NdFeB), Samarium—Cobalt (SmCo), and Aluminum—Nickel—Cobalt (AlNiCo) magnets. It is advantageous to use strong permanent magnets in accordance with this embodiment.

In accordance with an embodiment of the DC motor, the magnets are arranged at an inner surface of the yoke.

BRIEF DESCRIPTION OF THE DRAWINGS

The invention will now be described in more detail and with reference to the appended drawings in which:

FIGS. 1A-1D are schematic perspective views and a cross-sectional view of a conventional multi-turn distributed random wound stator winding in prior art motors;

In the below description of embodiments, similar parts in different figures are denoted with the same reference numerals.

DESCRIPTION OF EMBODIMENTS

Figure 1D:
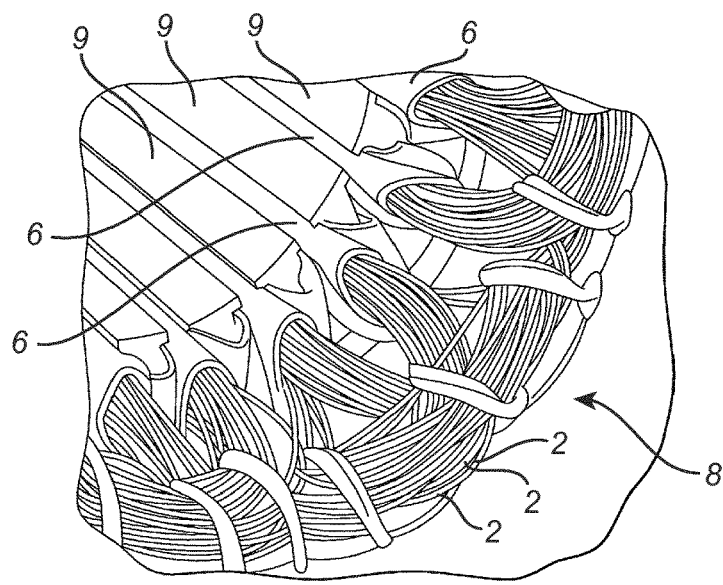
Figure 2:
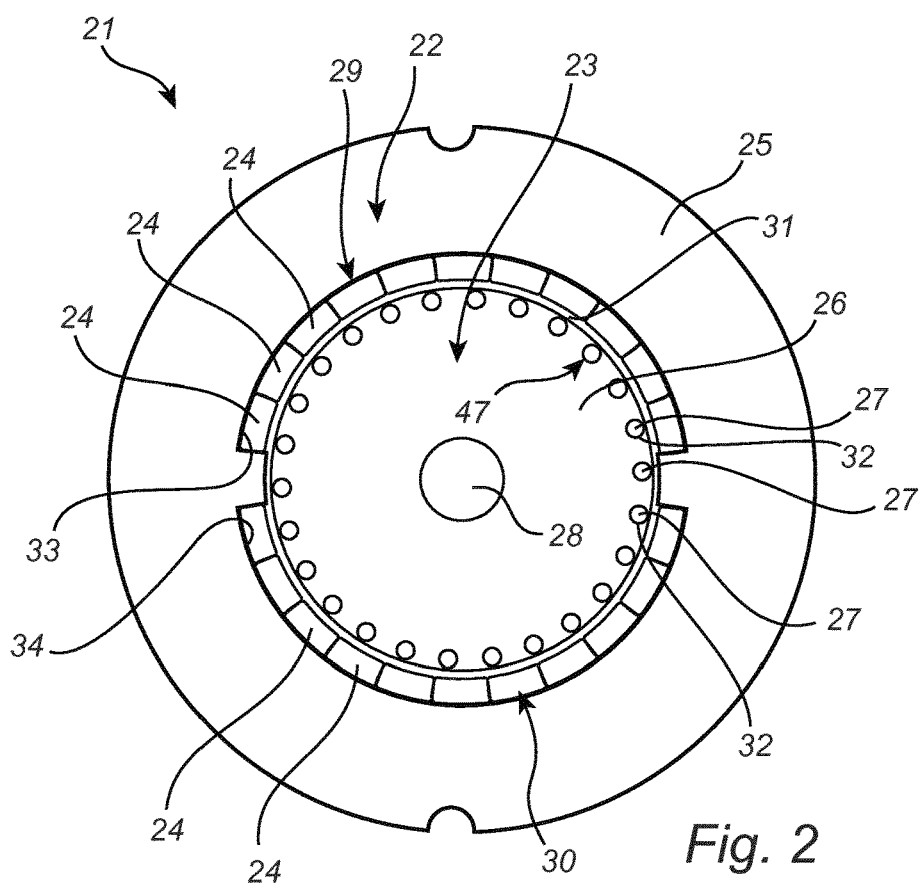
FIG. 2 is a schematic cross-sectional view of a two-pole DC motor embodiment of a DC motor according to the present invention.

In accordance with a first embodiment the DC motor 21 comprises a stator 22, and a rotor 23 arranged within the stator 22. The stator 22 comprises a yoke 25 defining a cylindrical cavity 31, and a plurality of permanent magnets 24 arranged at an inner surface of the yoke 25. Although understood by the person skilled in the art, it should be noted that the expression "at an inner surface" does include both the case that the permanent magnets 24 are aligned with, and thus define, the inner surface, or at least a major part thereof, as shown in FIG. 2, and the case where they are embedded in the stator yoke 25, but arranged relatively close to the inner surface thereof. Thus, the yoke 25 can be regarded as conductor-less since it has no conductor structures. The rotor 23 comprises a cylindrical core 26 and a conductor structure 47 arranged at the core 26.

Furthermore, the yoke 25 of the stator 22 is built from ring shaped steel sheets, which have been stacked together. In this embodiment the DC motor 21 is a two-pole motor. At the inner surface of the yoke 25 two recesses 33, 34 have been formed, each containing one of the permanent magnetic poles 29, 30. More particularly, each recess 33, 34 extends along the length of the stator 22, and thus of the yoke 25, and covers almost half the peripheral of the inner surface. A set of permanent magnets 24 has been mounted in each recess 33, 34. Each set contains eleven bar shaped Neodymium Iron Boron (NdFeB) magnets 24 arranged side by side. Thus, in a cross-section of the stator 22, the sets of magnets are arc-shaped. Four different grades of NdFeB magnets were used to obtain a more homogeneous flux distribution in the air gap of each pole 29, 30, across the arc of the magnetic pole. Five centre magnets 24 have the highest grade and the grade decreases away from the centre towards the sides of the poles 29, 30.

As an alternative, at the moment less preferred, the magnets are arranged separated from each other.

Figure 3:
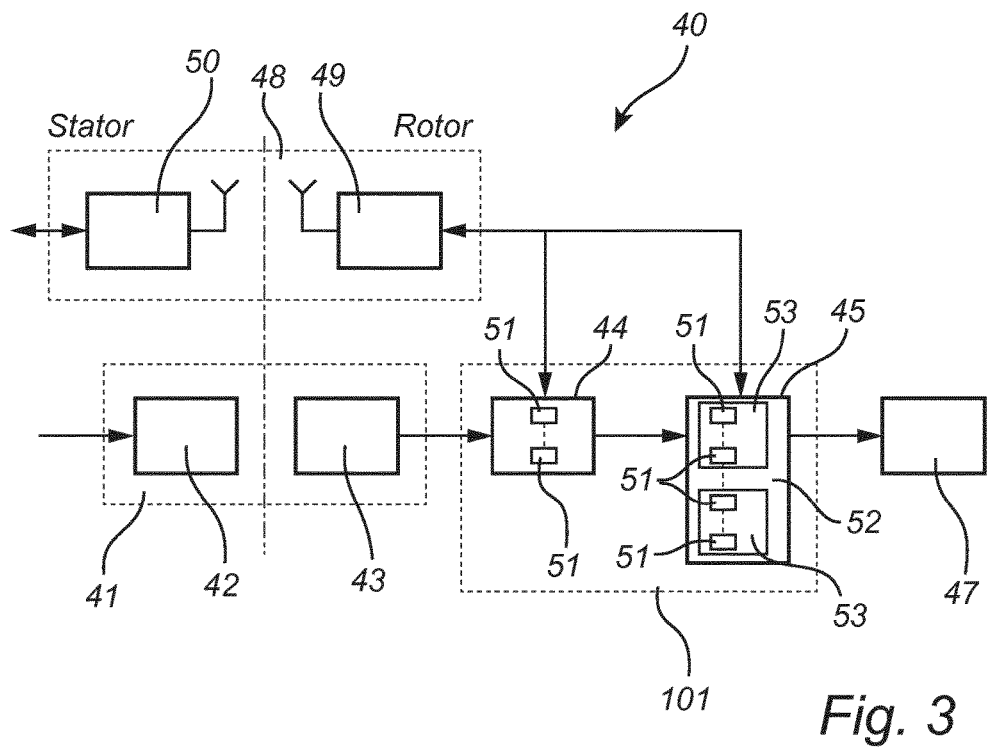
FIG. 3 is a block diagram of an embodiment of a motor drive device according to the present invention.

The DC motor further comprises a motor drive device 40, which is arranged partly at the stator 22 and partly at the rotor 23. A block diagram of the motor drive device 40 is shown in FIG. 3, where it is indicated with a dash-dotted line which parts are arranged at the stator 22 and at the rotor 23, respectively. The motor drive device 40 comprises an alternating current (AC) transformer 41, having a primary winding 42 arranged at the stator 22 and a secondary winding 43 arranged at the rotor 23, a rectifier device 44 arranged at the rotor 23 and connected with the secondary winding 43, a direct current supply device 45 arranged at the rotor 23 and connected with the rectifier device 44 and with the conductor structure 47. Further the motor drive device 40 comprises an operation control device 48 comprising a first unit 49 arranged at the rotor 23 and a second unit 50 arranged externally of the rotor 23 and wirelessly communicating with the first unit 49. Here, the second unit 50 is arranged at the stator 22. For instance, the wireless communication can be performed either with RF, or optically, or inductively.

Figure 4:
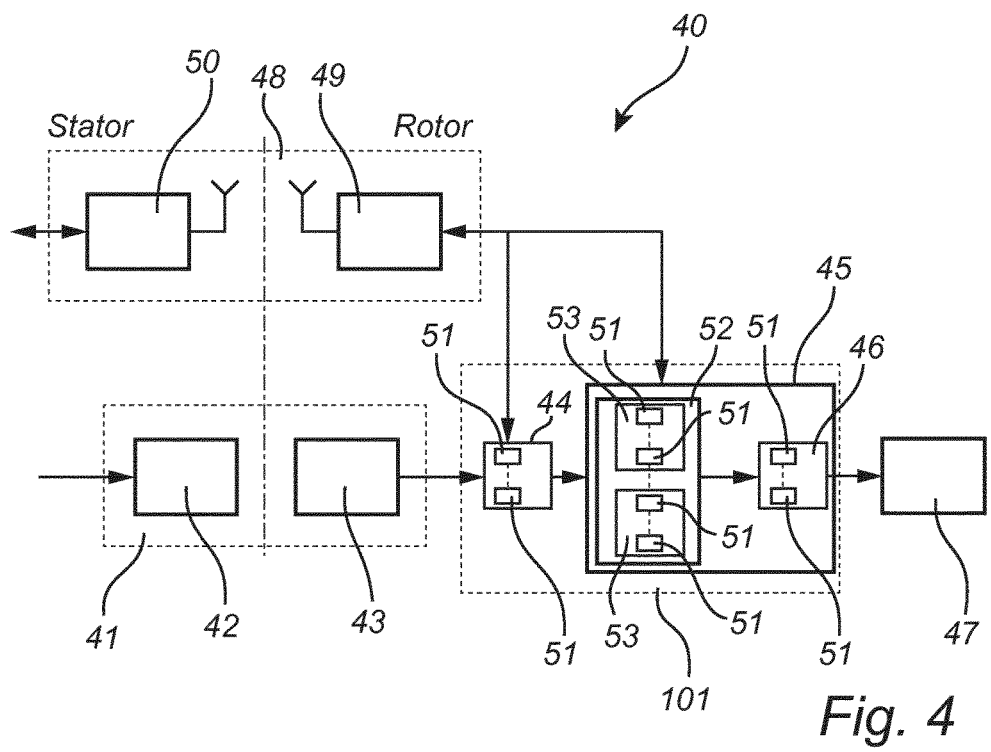
FIG. 4 is a block diagram of another embodiment of a motor drive device according to the present invention.

By means of the divided AC transformer 41, power supply for the other on-rotor parts 44, 45, 49 of the motor drive device 40, and for the conductor structure, or windings, 47 of the very rotor 23, can be supplied via fixed wires from the secondary winding 43 and on. Additionally, the power is supplied in a brush-less manner. Below, the rectifier device 44, and the direct current supply device 45, in common, will also be referred to as the on-rotor drive system. The AC transformer 41 is a step-down rotary transformer, which transforms three-phase AC power fed to the DC motor 21 to a lower voltage and a higher current, and the, thus, down-transformed AC voltage is then rectified by the rectifier device 44. As an alternative, one-phase AC power is used. The rectifier device 44 is an active rectifier stage based on semiconductors switches 51. The direct current supply device 45 is a DC/DC Switched Mode Power Supply stage, i.e. it comprises a direct current transformer 52, which in turn comprises multiple synchronous buck converters 53 with a bi-directional parallel and multi-phase topology, which supports bi-directional power flow. The buck converters 53 are also based on semiconductors switches 51. Consequently, the direct current supply device 45 generates an output having even lower DC voltage and higher DC current. The direct current supply device 45 outputs suitable DC voltage and current amplitudes to the conductor structure 47 of the rotor 23 in order to drive the motor 21 at a controlled speed and torque. In one embodiment of the motor drive device 40 as shown in FIG. 3, multiple synchronous buck converters 53 comprised in the direct current transformer 52 are directly connected to the conductors 27 of the conductor structure 47. These synchronous buck converters 53 can drive the conductor structure 47 utilizing the inductance from the conductor structure itself, hence the need of inductor components inside these synchronous buck converters are drastically reduced. The direct current supply device 45 further comprises Hall-effect switches (not shown), which track the orientation of the magnetic field of the stator 22, and thereby achieve the switch timing and duty cycle controls of synchronous buck converters 53 and to drive the motor 21 at a controlled speed and torque. In an second embodiment of the motor drive device 40 as shown in FIG. 4, the direct current supply device 45 further comprises an electronic commutator 46 arranged at the rotor 23 which is connected with the direct current transformer 52. Hence, the drive voltage is delivered through the electronic commutator 46, which comprises high current semiconductor switches 51 directly connected to the conductors 27 of the conductor structure 47. The electronic commutator 46 comprises Hall-effect switches (not shown), which track the orientation of the magnetic field of the stator 22, and thereby realizes the commutation function. According to one embodiment the semiconductor switches 51 are MOSFETs.

The conductor structure 47 in the cross-sectional view in FIG. 2 is also called rotor armature winding, and several of its preferred embodiments are described in the following sections.

Figure 5A:
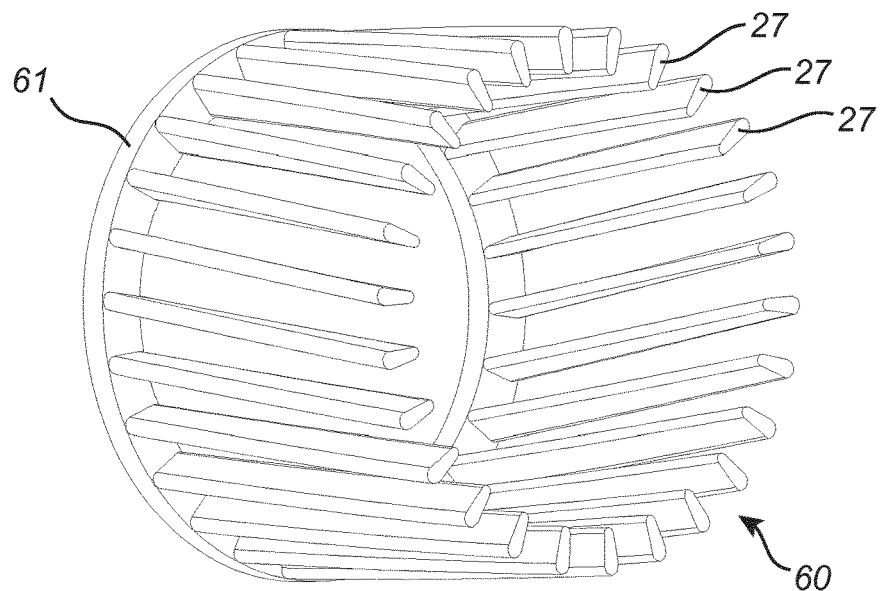
FIGS. 5A-5C are schematic perspective views of a squirrel cage conductor structure and a cross-sectional view of the rotor for an embodiment of a squirrel cage conductor structure according to the present invention.
Figure 5B:
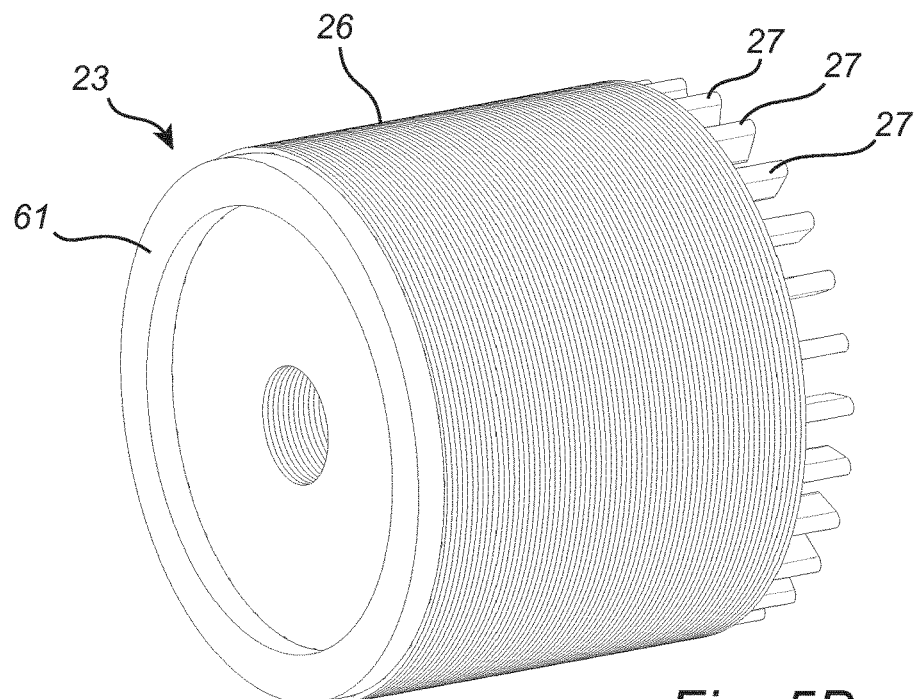
Figure 5C:
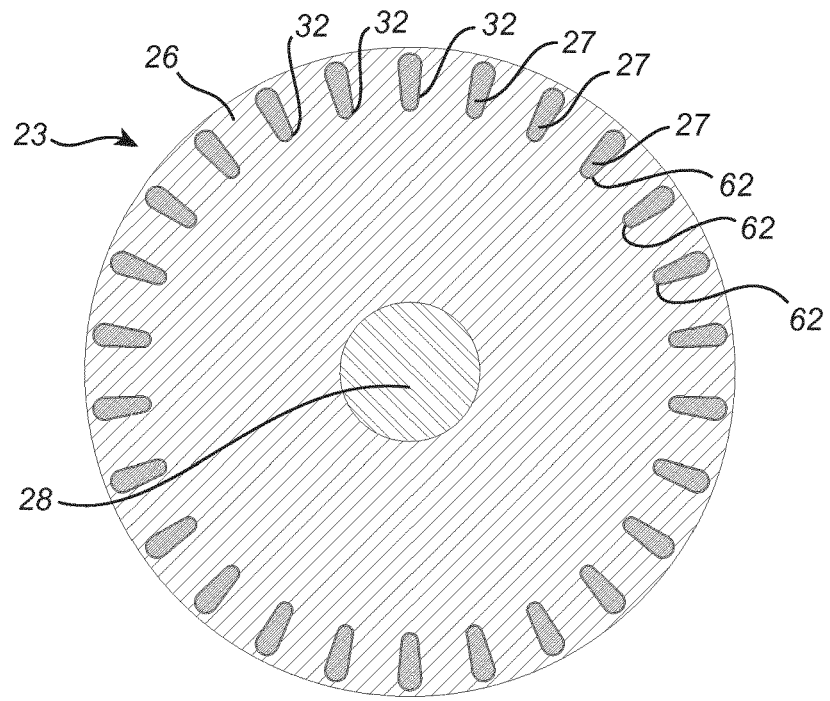
Figure 6A:
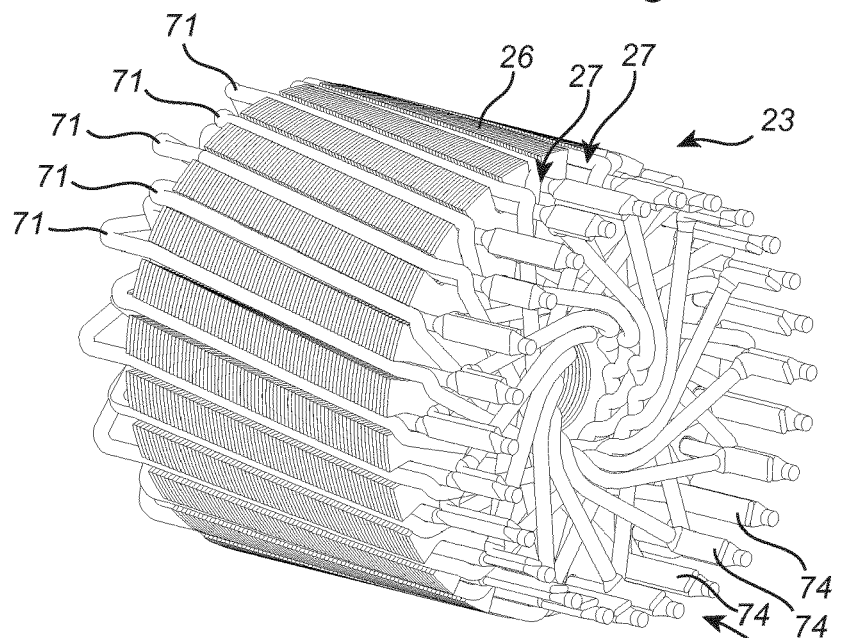
FIGS. 6A-6D are schematic perspective views and a cross-sectional view of a simplex winding embodiment of a lap winding conductor structure for a two-pole DC motor according to the present invention.
Figure 6B:
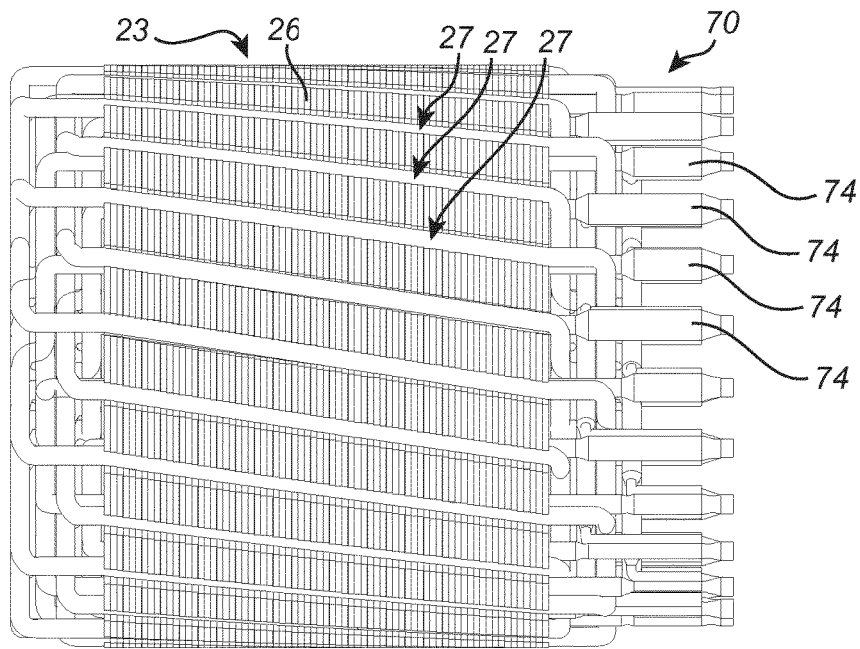
Figure 6C:
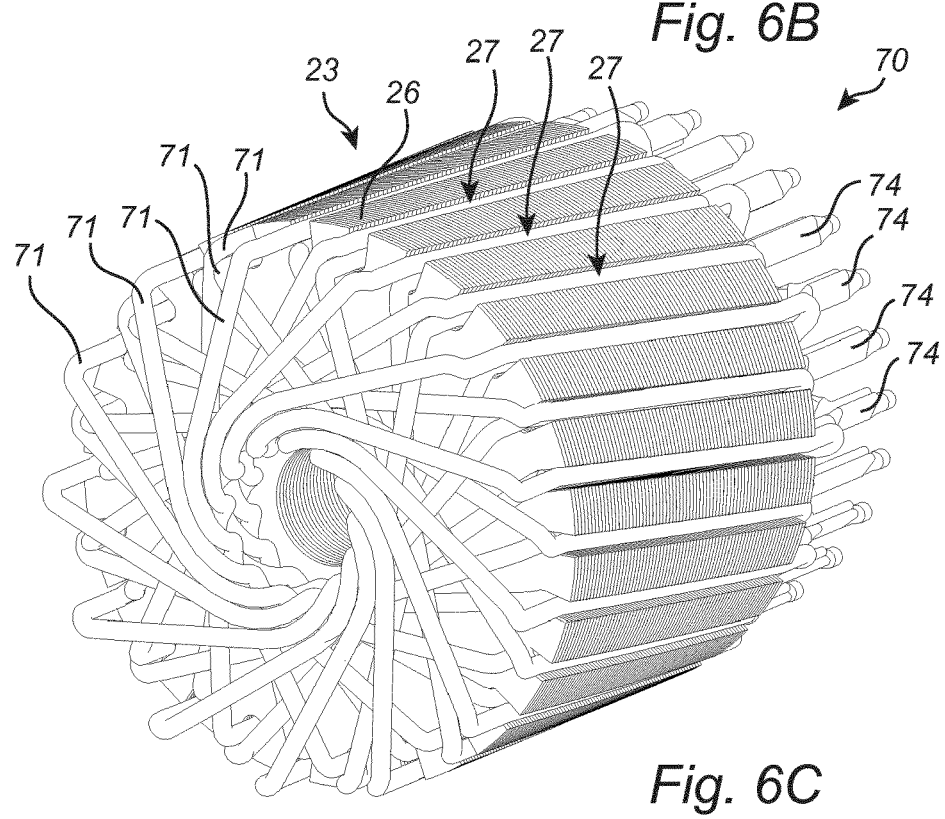
Figure 6D:
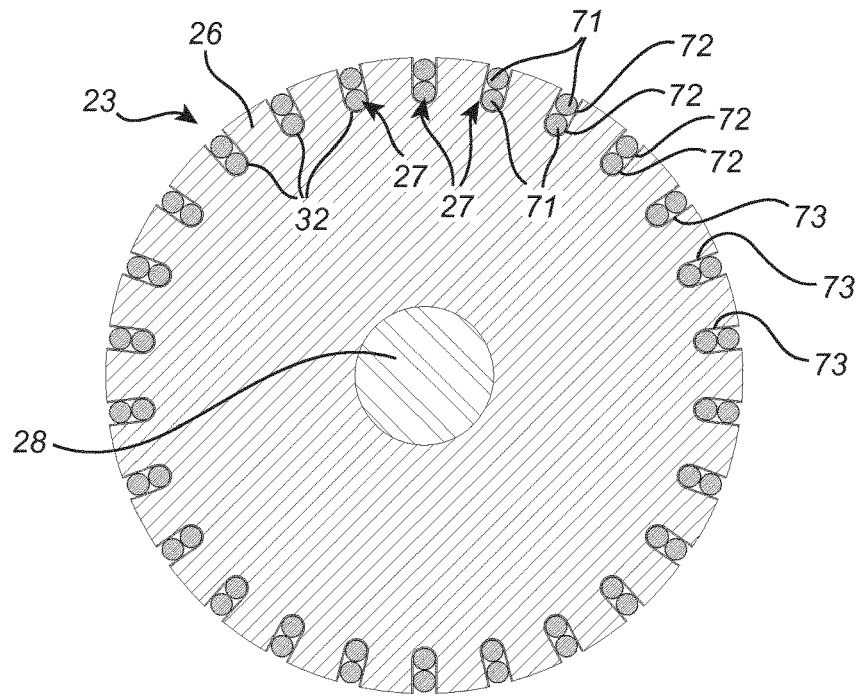
Figure 7A:
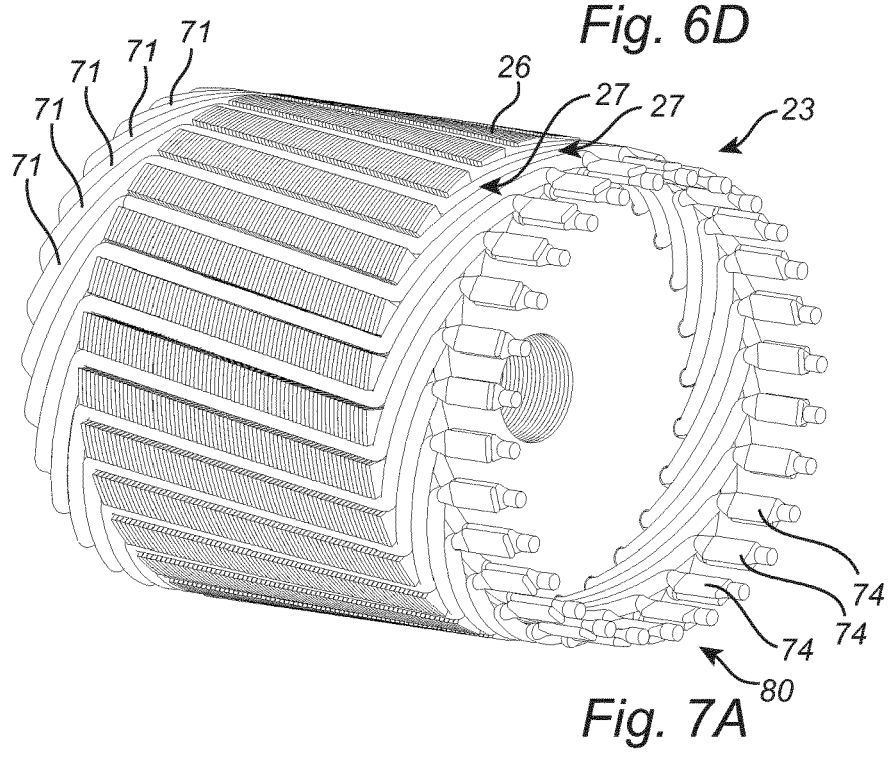
FIGS. 7A-7D are schematic perspective views and a cross-sectional view of a simplex winding embodiment of a wave winding conductor structure for a four-pole DC motor according to the present invention.
Figure 7B:
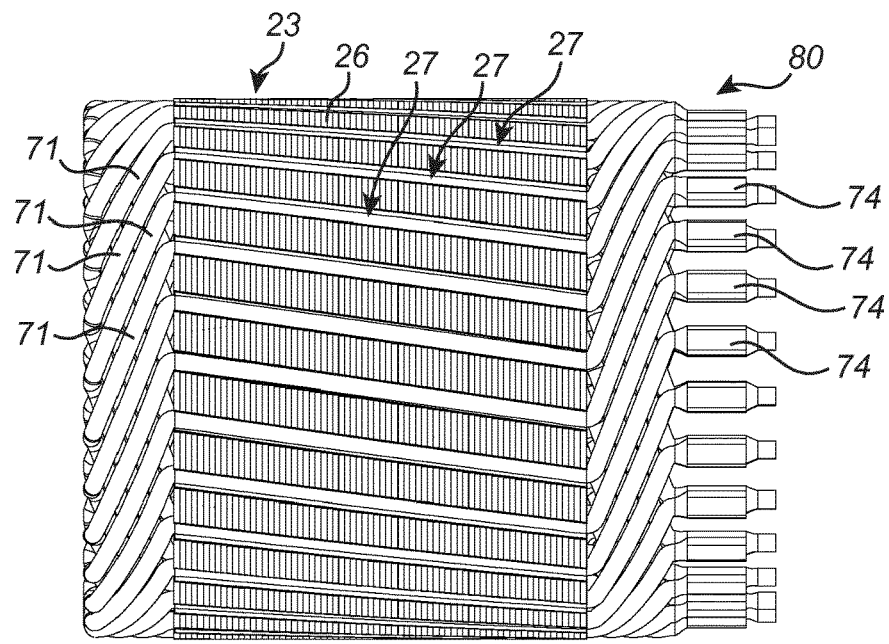
Figure 7C:
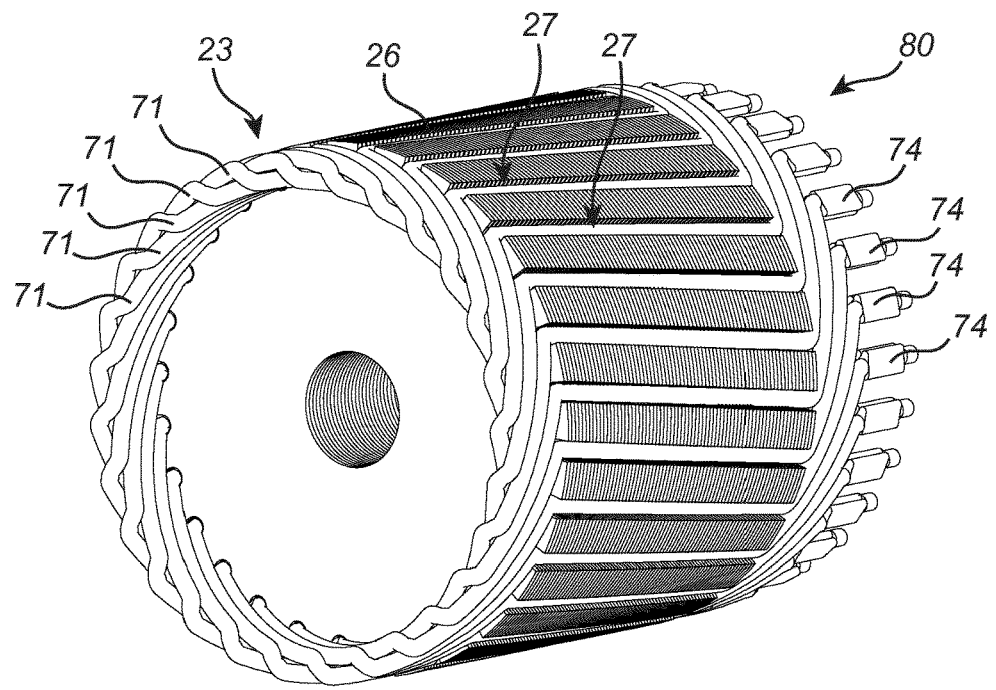
Figure 7D:
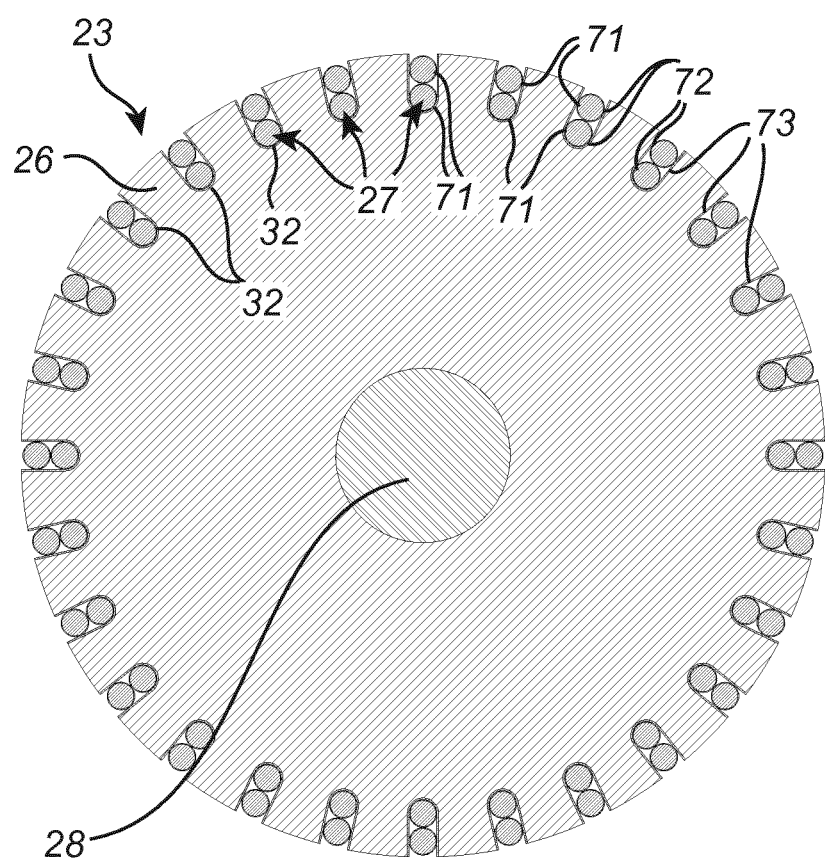

As shown in FIGS. 5A to 5C, in a first embodiment the conductor structure 47 is a squirrel cage structure 60 and comprises an end ring 61 together with twenty-six conductors 27 arranged close to the surface of the rotor 23 and extending equidistantly along the length of the rotor 23, and slightly obliquely to a centre shaft 28 thereof to reduce the reluctance torque ripple of the DC motor. Each of the twenty-six conductors 27 is electrically insulated from the core 26 by a thin insulation coating 62 between the conductor and the core. In accordance with this embodiment, the preferred materials for a die-cast production of the conductor structure 47 are aluminum and copper.

As shown in FIGS. 6A to 6D, in a second embodiment the conductor structure 47 is a simplex lap winding structure 70 for a two-pole DC motor and comprises twenty-six turns of conductors 27 arranged in the grooves around the surface of the rotor 23 and extending equidistantly along the length of the rotor 23, and slightly obliquely to a centre shaft 28 thereof to reduce the reluctance torque ripple of the DC motor. These twenty-six turns of conductors 27 are joined together at one end of the core 26 to form the lap winding structure.

As shown in FIGS. 7A to 7D, in a third embodiment the conductor structure 47 is a simplex wave winding structure 80 for a four-pole DC motor and comprises twenty-eight turns of conductors 27 arranged in the grooves around the surface of the rotor 23 and extending equidistantly along the length of the rotor 23, and slightly obliquely to a centre shaft 28 thereof to reduce the reluctance torque ripple of the DC motor. These twenty-eight turns of conductors 27 are joined together at one end of the core 26 to form the wave winding structure.

In accordance with the second and the third embodiments of the conductor structure 47, the structure is preferably made with preformed enameled copper wire 71 of round, square, rectangle or any other preferred shapes having thin electrical insulation coating 72 around the wire. Each groove around the surface of the rotor 23 receives two such wires 71. The electrical insulation between the wires 71 and the core 26 is ensured with another insulation layer 73, which is preferably made with insulation paper.

In accordance with the second and the third embodiments of the conductor structure 47, the preferred method for joining these conductors 27 at their ends is ultrasonic welding at the pre-pressed and non-insulated sections 74 of these conductors, to form ultrasonic welds. Because ultrasonic welding is a very fast industrial welding method which provides good mechanical robustness and low contact resistance and requires less space at the joint and it also reduces the possibility of insulation damage from overheating to nearby enameled wires as compared with other more intrusive welding methods.

In accordance with the three preferred embodiments of the conductor structure 47 described above, the core 26 comprises a plurality of circular sheets of metal, typically steel sheets, arranged on the centre shaft 28, bored and stacked together, which are also slightly oblique to accommodate the oblique conductors 27. Borings of the metal sheets provide pipes 32 through the core 26, where each pipe 32 contains a respective one of the conductors 27 of the conductor structure 47. However, as an alternative to the pipes 32, obliquely extending grooves at the surface of the rotor 23 can be provided, where the conductors 27 are received in the grooves. As mentioned above, the term "slot" will be used as a general term including any kind of appropriate structures of the core 26 useful for receiving the conductors 27, including the grooves and the pipes. In accordance with embodiments of the motor, the slots 32, i.e. the walls thereof, are pre-coated with electrical insulation coating, which constitutes the thin insulation coating 62 between the conductor and the core mentioned above.

Common for the above-described embodiments is that they have a low number of conductors 27, i.e. one or two, in each slot 32. This has been made possible by, inter alia, the low voltage and high current DC drive power. Since the number of conductors 27 is small, preferably at the most five conductors per slot 32, it has been possible to arrange them in an ordered way. By providing slots 32 having just enough space to receive the conductors 27, a high slot filling factor is achieved. Typical for the present embodiments is a slot filling factor above 0.8. Compared with conventional motors, such a rotor-excited low-voltage winding will drastically reduce the total winding resistive losses due to a much higher slot filling factor and a much shorter total winding length.

Figure 8:
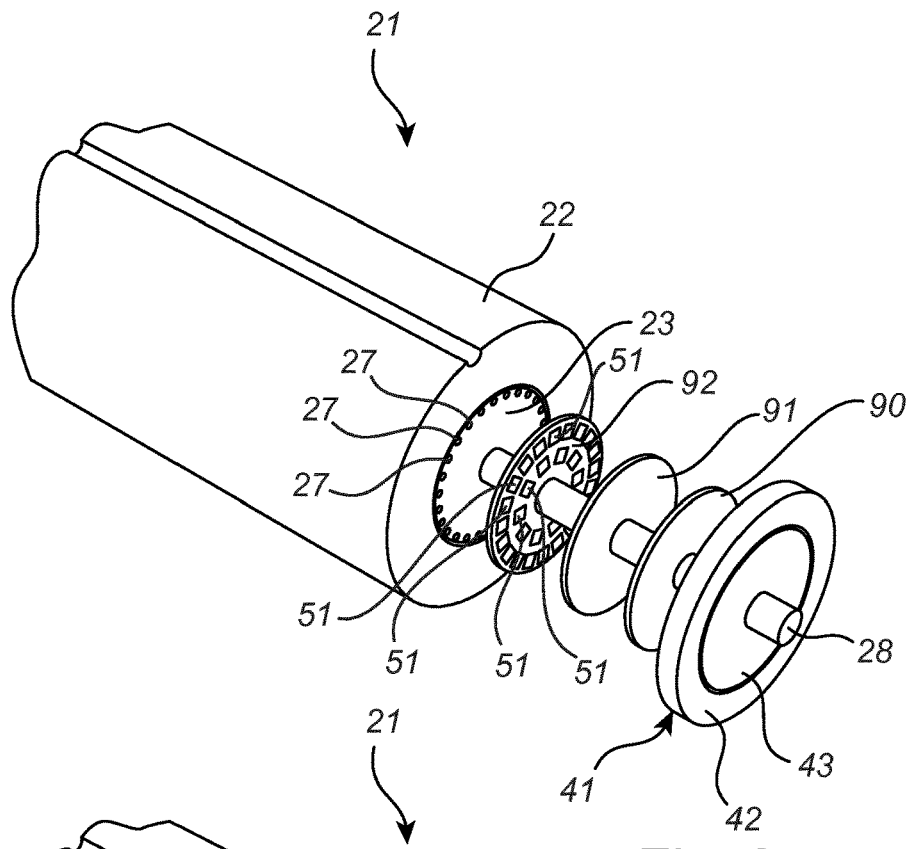
FIG. 8 is a schematic perspective view of an embodiment of the motor drive device as mounted on the DC motor, according to the present invention.
Figure 9:
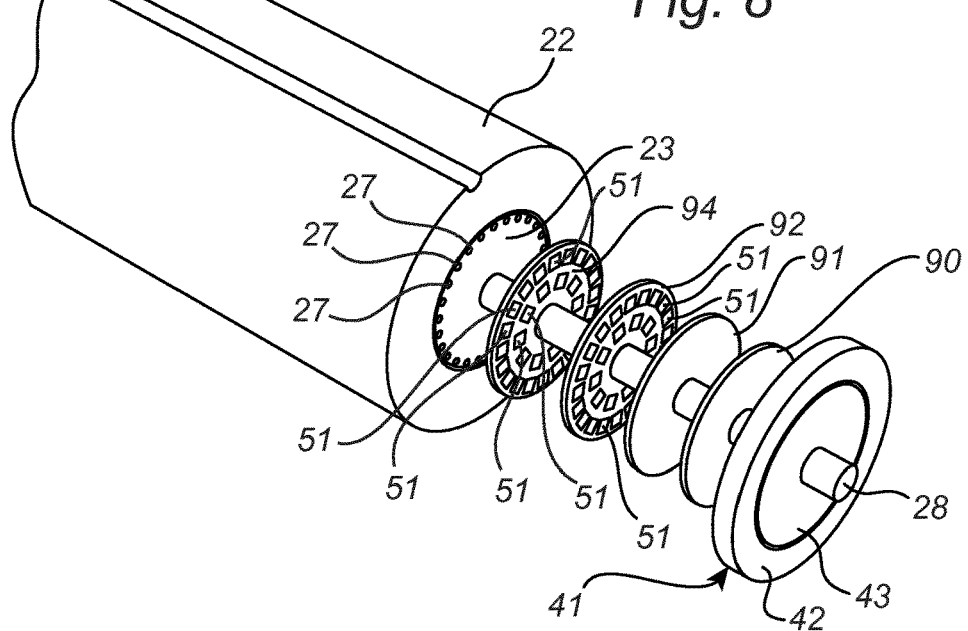
FIG. 9 is a schematic perspective view of another embodiment of the motor drive device as mounted on the DC motor, according to the present invention.

In accordance with the first embodiment of the DC motor and with the first embodiment of the motor drive device 40, in order to obtain a well-balanced and compact motor drive device 40, the rectifier device 44 and the direct current supply device 45 both comprise, and here are fully provided as, circular boards 91 and 92, typically printed circuit boards, mounted at the centre shaft 28 of the rotor 23, close to the end of the core 26 where the end leads of the conductors 27 of the conductor structure 47 are located, with the DC supply board 92 positioned most adjacent to the core 26 and the rectifier board 91 positioned after the DC supply board 92, as most schematically illustrated in FIG. 8. However, for clarity reasons the parts in FIG. 8 are shown clearly separated from each other. The DC supply board 92 comprises multiple synchronous buck converters 53, which are distributed around the board 92, and which are connected with the conductors 27. In accordance with the first embodiment of the DC motor and with the second embodiment of the motor drive device 40, the electronic commutator 46 also comprises a circular board 93, also typically a printed circuit board, mounted at the centre shaft 28 of the rotor 23, close to the same end of the core 26 where the end leads of the conductors 27 of the conductor structure 47 are located, with the commutator board 93 positioned most adjacent to the core 26, as most schematically illustrated in FIG. 9. The commutator board 93 comprises multiple pairs of semiconductor switches 51, which are distributed around the board 93, and which are connected with the conductors 27. In accordance with the first embodiment of the DC motor and with both embodiments of the motor drive device 40, a circular operational control board 90, implementing the first unit 49 of the operational control device 48, is mounted adjacent to the rectifier board 91, and connected to the other boards. Thus, the operational control board 90 is arranged between the rectifier board 91 and the rotor mounted part, i.e. the second winding, 43 of the AC transformer 41. The shape of the circuit boards can be different, e.g. any symmetric shape will be feasible, such as a polygonal shape. In another embodiment the AC transformer and the rectifier device are fully integrated as a single transforming and rectifying device, but can still be functionally regarded as two separate devices as defined in the claims. Other combinations are feasible as well, such as combining the direct current supply device 45 with the rectifier device 44 to a common DC power generation device 101, which could be arranged as a separate board, or even integrated with the secondary winding 43 of the AC transformer 41 into a common circular package, or even integrating the first unit 49 of the operational control device 48 into the other boards.

The on-rotor motor drive system 40 can thus be made highly integrated with the rotor armature. Thereby it can drastically reduce the drive current loop path distance and hence further reduce the resistive losses of this motor. Furthermore, a major part of the electronic components used for the on-rotor motor drive system 40 can be mass-volume low-cost commercial off-the-shelf miniaturized components from general electronics industry, since today there are competent enough components among them. The low-voltage high-current on-rotor drive system built with such components has a bi-directional, parallel and scalable architecture and it takes the advantage of the low-voltage DC multiphase drive topology with high operating frequency to drastically increase the power density, minimize the output harmonics and enable partial shut-down and regenerative braking capabilities, all of which contribute to the improvement of the drive efficiency and performance throughout the motor operating speed and torque ranges. The step-down rotary transformer which deliver utility AC power brushless from stator to rotor can be designed with state-of-the-art electrical steel to also reach high efficiency and it can be produced by the standard production methods of industrial transformers.

The operation control device 48 receives in real time the motor control parameters such as start/stop, direction, speed and torque settings. This information is wirelessly transmitted from the second unit 50 externally of the rotor 23 to the first unit 49 on the rotor 23. The operation control device 48 converts these parameters into detailed control commands such as the drive voltage and drive current. This conversion process utilizes key parameters of the motor model stored in the operation control device 48, such as speed constant and torque constant. The control commands are then used to adjust the rectifier device 44, the direct current supply device 45 and the electronic commutator 46 accordingly, with important parameters such as switching sequence, switching frequency and duty cycle, on/off control of individual phases. The operation control device 48 also receives important data in real time from the rectifier device 44, the direct current supply device 45 and the electronic commutator 46, such as input voltage and current, drive voltage, individual phase current, rotor rpm, back-electromotive force, operating temperature, diagnostic data, and so on. This data is used by the operation control device 48 to monitor the condition and the health of the motor, and if needed, they can also be forwarded wirelessly from the first unit 49 on the rotor 23 back to the second unit 50 externally of the rotor.

In summary, the above embodiments present a brushless DC motor design, which is a rotor-excited in-runner motor having permanent magnets on the stator and a rotor-excited winding having a simple configuration with much less number of turns, even only one turn, in each electrical steel slot to achieve a much higher slot filling factor, and hence a much lower winding inductance and operating voltage than those of conventional SQIM and BLPMM motors. The stator of the present DC motor is unpowered and completely passive while all the power is delivered to its rotor to excite the on-rotor winding. Compared with stator windings of conventional motors, this configuration drastically reduces the total current loop length of the winding, while it increases the path width of the winding and improves the duty ratio of the active length to the total length of the winding. One important factor is that a rotor is typically much smaller than a stator in the diameter and the end winding size can be highly reduced due to a simpler winding having less number of turns, so these features all lead to a winding with lower resistive loss. This on-rotor winding is excited with a low-voltage variable-speed DC drive system mounted besides the winding on the same rotor shaft of the motor, which further reduce the resistive loss as the distance between the drive and the winding is drastically reduced. This on-rotor drive system efficiently handles the variable speed requirement of the motor by taking power from its power supply and converting it at a high efficiency to the suitable output voltage and current needed to excite the winding and operate the motor at the suitable speed and torque. The power input of this on-rotor low-voltage variable-speed drive system is delivered in a brushless means from utility power sources connected at the stator of the motor, and a high-to-low or step-down voltage conversion has been realized by the same means with a high efficiency to match the voltage difference between the utility power sources and the operating voltage of the low-voltage on-rotor drive system.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. Any reference signs in the claims should not be construed as limiting the scope.

The invention claimed is:

1. A direct current motor comprising:
   a stator;
   a rotor arranged within the stator; and
   a motor drive device arranged partly at the stator and partly at the rotor, wherein the stator comprises a yoke defining a cylindrical cavity, and a plurality of permanent magnets arranged at the yoke, wherein the rotor comprises a cylindrical core and a conductor structure arranged at the core, wherein the motor drive device comprises an alternating current transformer having a primary winding arranged at the stator and a secondary winding arranged at the rotor, a rectifier device arranged at the rotor and connected with the secondary winding, a direct current supply device arranged at the rotor and connected with the rectifier device, and with the conductor structure, and an operation control device comprising a first unit arranged at the rotor and a second unit arranged externally of the rotor and wirelessly communicating with the first unit.

2. The direct current motor according to claim 1, wherein the conductor structure comprises one of a squirrel cage structure, a lap winding structure, and a wave winding structure.

3. The direct current motor according to claim 2, wherein the squirrel cage structure is made of die-casted aluminum or copper, and wherein core comprises slots through which the squirrel cage structure extends, which slots are pre-coated with an electrical insulation coating.

4. The direct current motor according to claim 2, wherein the lap winding and the wave winding structures are made of pre-formed enameled copper wires, which are interconnected by means of ultrasonic welds.

5. The direct current motor according to claim 4, wherein the core of the rotor is provided with circumferentially separated slots extending along the length of the core near its surface, each slot containing a respective one of the conductors of the squirrel cage, lap winding, or wave winding structure of conductors, each conductor comprising at least one turn of wire.

6. The direct current motor according to claim 2, wherein the core of the rotor is provided with circumferentially separated slots extending along the length of the core near its surface, each slot containing a respective one of the conductors of the squirrel cage, lap winding, or wave winding structure of conductors, each conductor comprising at least one turn of wire.

7. The direct current motor according to claim 1, wherein the alternating current transformer comprises at least one magnetic core around its primary winding and its secondary winding.

8. The direct current motor according to claim 1, wherein the direct current supply device comprises a direct current transformer arranged to down-transform a direct current voltage received from the rectifier device to another direct current voltage adapted to an excitation of the conductor structure to operate the direct current motor.

9. The direct current motor according to claim 1, wherein the direct current supply device further comprises an electronic commutator, which is connected between the direct current transformer and the conductor structure, which electronic commutator comprises semiconductor switches to commutate the respective conductors of the conductor structure based on a relative position between the respective conductors and the plurality of permanent magnets and on a rotational speed of the rotor.

10. The direct current motor according to claim 1, wherein the rectifier device is an active rectifier based on semiconductor switches, which supports power factor correction function and bi-directional power flow.

11. The direct current motor according to claim 1, wherein the rectifier device, the direct current supply device and the first unit of the operation control device comprise at least one circular board mounted at a center shaft of the rotor.

12. The direct current motor according to claim 11, wherein the electronic commutator comprised in the direct current supply device comprises at least one circular board mounted at a center shaft of the rotor.

13. The direct current motor according to claim 1, wherein the primary winding is configured to be connected with a three-phase power source, and wherein the rectifier device is a full wave rectifier.

14. The direct current motor according to claim 1, wherein the permanent magnets are elongated, extend between the ends of the stator cavity, and are grouped in at least two groups, each constituting a pole, and wherein the permanent magnets within each group are arranged adjacent to each other.

15. The direct current motor according to claim 14, wherein each group contain magnets of different grades, where at least one magnet at the middle of the group has the highest grade.

16. The direct current motor according to claim 1, wherein the permanent magnets are chosen from a group of magnets comprising Neodymium-Iron-Boron, Samarium-Cobalt, and Aluminum-Nickel-Cobalt magnets.

17. The direct current motor according to claim 1, wherein the magnets are arranged at an inner surface of the yoke.

18. A variable-speed direct current motor comprising:
a stator;
a rotor arranged within the stator; and
a motor drive device arranged partly at the stator and partly at the rotor, wherein the stator comprises a yoke defining a cylindrical cavity, and a plurality of permanent magnets arranged at the yoke, wherein the rotor comprises a cylindrical core and a conductor structure arranged at the core, wherein the motor drive device comprises an alternating current transformer having a primary winding arranged at the stator and a secondary winding arranged at the rotor, a rectifier device arranged at the rotor and connected with the secondary winding, a direct current supply device arranged at the rotor and connected with the rectifier device, and with the conductor structure, and an operation control device comprising a first unit arranged at the rotor and a second unit arranged externally of the rotor and wirelessly communicating with the first unit, wherein the direct current supply device comprises a direct current transformer arranged to down-transform a direct current voltage received from the rectifier device to another direct current voltage adapted to an excitation of the conductor structure to operate the direct current motor.

19. A variable-speed direct current motor comprising:
a stator;
a rotor arranged within the stator; and
a motor drive device arranged partly at the stator and partly at the rotor, wherein the stator comprises a yoke defining a cylindrical cavity, and a plurality of permanent magnets arranged at the yoke, wherein the rotor comprises a cylindrical core and a conductor structure arranged at the core, wherein the motor drive device comprises an alternating current transformer having a primary winding arranged at the stator and a secondary winding arranged at the rotor, a rectifier device arranged at the rotor and connected with the secondary winding, a direct current supply device arranged at the rotor and connected with the rectifier device, and with the conductor structure, and an operation control device comprising a first unit arranged at the rotor and a second unit arranged externally of the rotor and wirelessly communicating with the first unit, wherein the direct current supply device comprises a direct current transformer arranged to down-transform a direct current voltage received from the rectifier device, to a lower direct current voltage arranged to be delivered to the conductor structure.

* * * * *